United States Patent [19]

Stoutenberg

[11] 3,775,020
[45] Nov. 27, 1973

[54] DRILL GUIDE
[75] Inventor: Carl Christian Stoutenberg, Avon, Conn.
[73] Assignee: The Stanley Works, New Britain, Conn.
[22] Filed: Jan. 31, 1972
[21] Appl. No.: 222,162

[52] U.S. Cl. .................................. 408/115, 33/189
[51] Int. Cl. .......................................... B23b 49/00
[58] Field of Search ..................... 408/115, 72, 241; 33/201, 185 R, 189, 191

[56] References Cited
UNITED STATES PATENTS

| 907,735 | 12/1908 | Cain, Jr. ........................ 408/115 X |
| 3,049,031 | 8/1962 | Carstens ........................ 408/115 X |
| 2,966,815 | 1/1961 | Ramien ............................... 408/72 |
| 2,936,657 | 5/1960 | Berlin et al. .................... 408/115 X |
| 437,796 | 10/1890 | Preston ................................ 408/72 |

Primary Examiner—Gil Weidenfeld
Attorney—Peter L. Costas

[57] ABSTRACT

A drill guide includes a frame member having a shoe for seating upon the surface of a workpiece to be drilled and a turntable member rotatably seated upon the shoe and having a multiplicity of drill guide apertures disposed radially outwardly from its axis of rotation. The drill guide apertures are adapted to provide radial support for drill bits appropriately sized with respect thereto and thereby permit drilling substantially perpendicularly to the front surface of the workpiece. The drill guide shoe desirably includes a pointer and cooperating means for alignment of the drill guide upon the workpiece and it may include a handle or housing which is adapted to store drill bits and the like.

14 Claims, 6 Drawing Figures

DRILL GUIDE

BACKGROUND OF THE INVENTION

Various devices have been proposed for guiding a drill and bit in the course of drilling a workpiece so as to maintain perpendicularity thereof to the surface being drilled. The advantages to such drill guides have long been known and exemplary patents disclosing various types of devices are: U.S. Pat. to Preston No. 437,796 U.S. Pat. to Beard No. 2,383,953 U.S. Pat. to Griffin No. 2,466,023 U.S. Pat. to Scharf No. 2,788,684 U.S. Pat. to Lavering et al. No. 3,381,551. As will be readily appreciated from a review of such prior art devices, they have been relatively limited as to the number of sizes of drill bits for which they would provide guidance and have frequently lacked adequate stability.

More recently, there has been proposed a drill guide comprising a rigid block containing a multiplicity of drill guide apertures of varying sizes and adapted to be stably seated upon the surface of the workpiece to be drilled. This drill guide includes stabilizing means mounted on the block which will serve to prevent tilting of the block relative to the surface to be drilled. This novel drill guide is the subject matter of U. S. application Ser. No. 221,626 filed Jan. 28, 1972 by Alfred Z. Boyajian and entitled DRILL GUIDE.

The Boyajian drill guide offers many advantages over prior art devices but does not include means for facile and accurate positioning of the guide aperture over the center point for the hole to be drilled in the workpiece. Moreover, the Boyajian drill guide generally requires movement of either the entire block or of the entire drill guide in order to effect a change in the size of the drill guide aperture being employed.

It is an object of the present invention to provide a novel drill guide in which the drill guide apertures are spaced in a generally circular array about a turntable member rotatably supported upon a shoe for facile changing of drill guide apertures.

It is also an object to provide such a drill guide which includes means for quick and accurate alignment of the drill guide apertures with the center proposed for the hole to be drilled in the workpiece.

Another object is to provide such a drill guide in which the working position always is spaced at the maximum distance from the handle or frame of the drill guide.

Still another object is to provide such a drill guide having a handle or housing in which drill bits or the like may be conveniently stored.

SUMMARY OF THE INVENTION

It has been found that the foregoing and related objects can be readily attained in a drill guide having a frame member providing a generally planar shoe for seating upon the surface of a workpiece to be drilled with an aperture therein in alignment with the preselected location in a workpiece for the drilling of the desired hole. A turntable is rotatably seated upon the shoe and has a multiplicity of axially extending guide apertures disposed radially outwardly from the axis of rotation thereof and is rotatably mounted by suitable means upon the shoe. The mounting means permits rotation of the turntable for rotation of a preselected one of the guide apertures into alignment with the aperture in the shoe.

In accordance with the preferred embodiment of the drill guide, the shoe has a generally V-shaped pointer portion intermediate the length of its forward edge; and the edge surface portions to either side of the pointer portion are aligned and the pointer portion has a guide line extending perpendicularly to the line defined by those edge surface portions. The axis of the aperture in the shoe is aligned with the point of intersection between the line defined by the guide line on the pointer portion and the line defined by the edge surfaces to either side of the pointer portion. In this manner, the drill guide may be positioned on perpendicular lines scribed on the surface of the workpiece with the preselected drill guide aperture in registry with the intersection of the scribed lines. In this embodiment, the aperture in the shoe is a hole adjacent the intersection between the pointer portion and the body portion of the shoe, the axis of which is in alignment with the lines defined by the guide line of the pointer portion and the edge surface portions to the opposite sides thereof.

In its most desirable form, the turntable has a generally helical configuration providing a ramp type upper surface with the largest of the drill guide apertures being positioned adjacent the upper end of the helical surface and with the smallest of the drill guide apertures being positioned adjacent the lower end of the helical surface. The turntable has a circular bottom surface and its side surface tapers upwardly and inwardly to a reduced diameter cross section; the side surface has a multiplicity of lines extending generally vertically in radial alignment with the drill guide apertures so as to facilitate alignment thereof with the apertures in the shoe.

The body portion of the drill guide is most conveniently fabricated so as to have an inverted U-shape with the shoe extending forwardly from one of the legs of the body portion and lying in a common plane with the free end of the other leg of the body portion so as to provide stable seating upon the surface of the workpiece. The frame member most conveniently has a hollow handle or housing disposed about its body portion and that hollow handle may have a moveable closure therein providing access to the interior thereof for storage of drill bits and the like.

In the preferred embodiment, the guide apertures are disposed in a circular array about the axis of rotation of the turntable and the radius of that array is equal to the distance from the axis of rotation of the turntable on the shoe to the center line of the aperture in the shoe. To lock the turntable against relative rotation, the shoe is provided with an upstanding locking projection thereon and the turntable has at least one cooperating recess formed in the bottom surface thereof which will seat the locking projection. Most conveniently, the turntable has a multiplicity of recesses in its bottom surface each cooperating with one of the drill guide apertures so as to ensure proper alignment thereof.

DETAILED DESCRIPTION OF THE ILLUSTRATED EMBODIMENT

Figure 1:
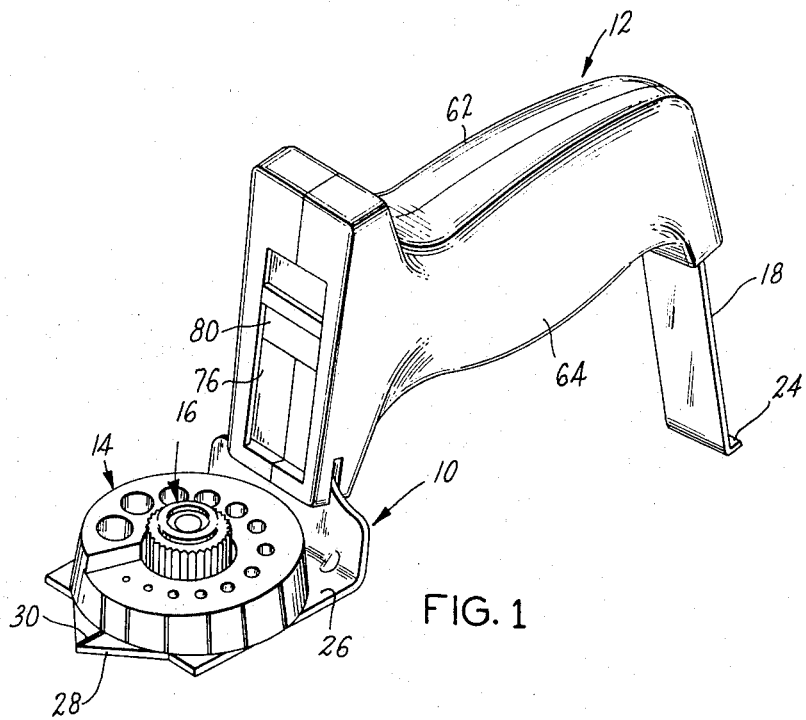
FIG. 1 is a perspective view of a drill guide embodying the present invention.

Turning now in detail to the drill guide specifically illustrated in the accompanying drawings, it can be seen that it includes a unitary frame member generally designated by the numeral 10, a clam shell handle or housing generally designated by the numeral 12 and a guide plate or turntable generally designated by the numeral 14. As will be described more fully hereinafter, the guide plate 14 is rotatably supported upon the frame member 10 and adjustably secured in a predetermined position by the adjusting nut assembly generally designated by the numeral 16.

Figure 5:
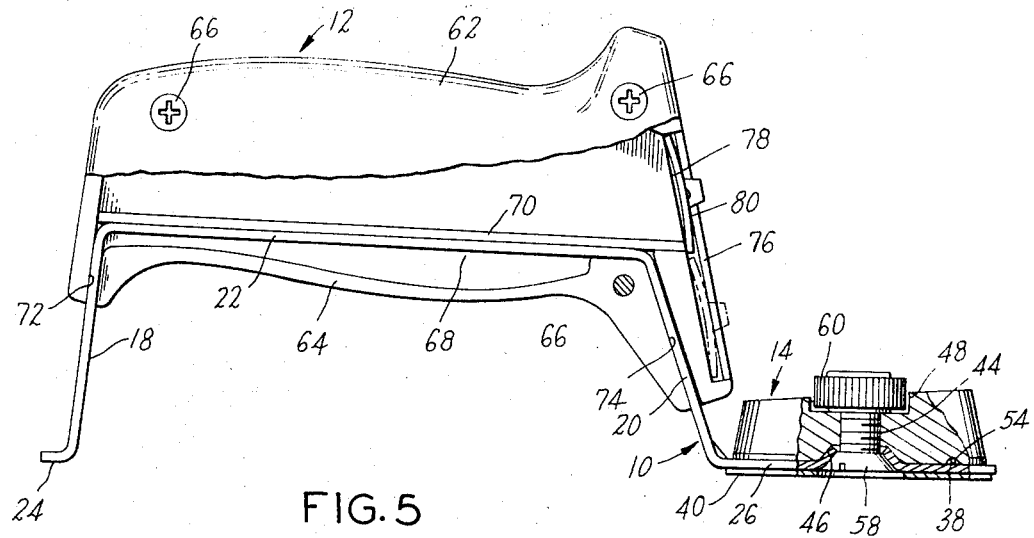
FIG. 5 is a side elevational view with portions of the handle and turntable broken away for purposes of illustration and with the door closure shown in full line in its closed position and in phantom line in its open position.
Figure 6:
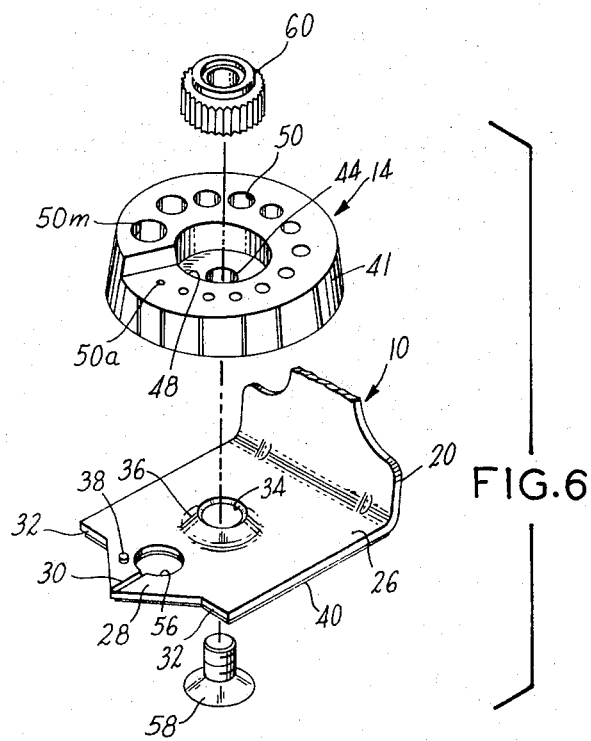
FIG. 6 is a fragmentary partially exploded view of the turntable and shoe subassembly.

Referring first to the frame member, it is most clearly illustrated in FIG. 5 and can be seen to have a generally inverted U-shaped body portion defined by the legs 18,20 and the center portion 22. The rearward leg 18 has an outwardly or rearwardly bent flange 24 at its free end which is of relatively short length, and the forward leg 20 has a forwardly extending shoe 26 of considerably greater length. The flange 24 and shoe 26 extend in a common plane and thus provide a means for stable seating of the drill guide upon a planar surface. The shoe 26 is of greater width than the bulk of the length of the body portion and the lower portion of the leg 20 is also of greater width and is configured to blend that greater width into the smaller width of the bulk of the body portion, as is best seen in FIG. 1.

The forward edge of the shoe 26 is configured to provide a V-shaped pointer portion 28 intermediate its width, and the pointer portion 28 has a guide line 30 in the upper surface extending centrally thereof to its apex. The guide line 30 extends perpendicularly to the line defined by the edge surface portions 32 to either side of the pointer portion 28, all for a purpose to be described more fully hereinafter.

Adjacent its central portion, the shoe 26 is provided with a mounting aperture 34 and the material thereabout is deformed upwardly to provide a frustoconical boss 36. The pointer portion 28 is staked to one side of its center line to provide an upwardly extending locking boss or projection 38. To ensure firm frictional seating on the surface of a workpiece, the underside of the shoe 26 has adhesively engaged thereon a pad 40 of material affording a high coefficient of friction to minimize any tendency for sliding along the surface of the workpiece.

Figure 2:
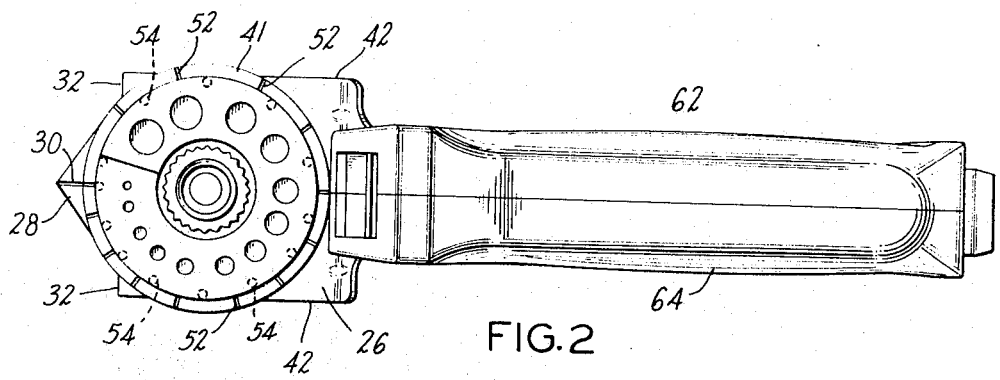
FIG. 2 is a top plan view thereof showing in dotted line the circular recesses on the bottom surface of the turntable for receiving the locking pin.

The guide plate or turntable member 14 which is rotatably mounted upon the shoe 26 is of generally helical configuration with the side surface 41 thereof tapering slightly upwardly and inwardly. As seen in FIG. 2, the diameter at its bottom surface is slightly larger than the width and length dimensions of the shoe 26 so that it overlaps the side edges 42 and front edge surface portions 32, but it does not overlap the main part of the pointer portion 28 so that the guide line 30 is clearly visible. A mounting aperture 44 extends coaxially therethrough and the bottom surface is provided with a generally frustoconical counterbore 46 cooperating with the frustoconical boss 36 of the shoe 26. The upper surface is provided with a generally cylindrical counterbore 48 in which is seated the adjusting nut assembly 16.

Figure 3:
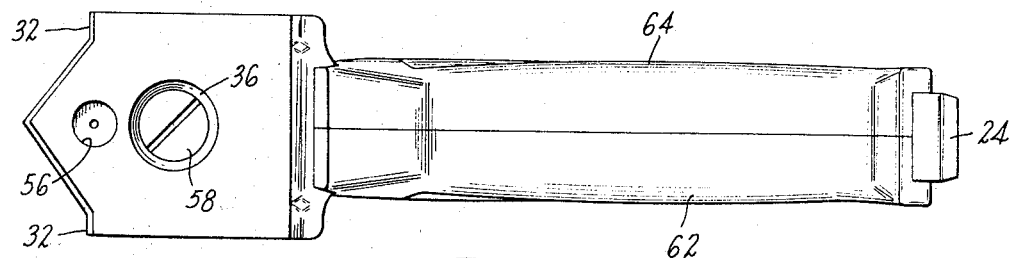
FIG. 3 is a bottom view of the drill guide.
Figure 4:
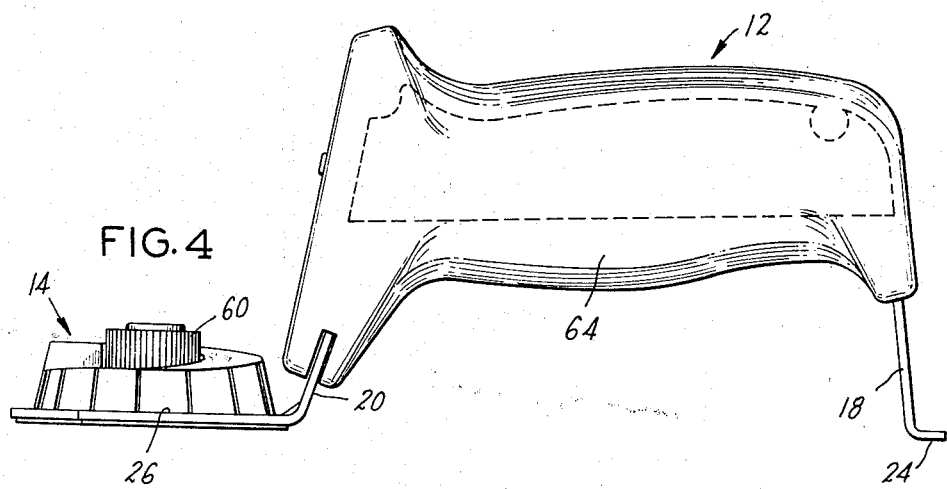
FIG. 4 is a side elevational view thereof showing in dotted line the handle chamber for storing drill bits.

Spaced radially outwardly from the mounting aperture 44 in a generally circular array are a multiplicity of axially extending guide apertures or passages 50 of graduated and increasing size with the largest diameter aperture 50m being located adjacent the high point of the helical upper surface and the smallest diameter aperture 50a being located adjacent the low point of the helical upper surface. As can be seen, the apertures or passages 50 thus extend perpendicularly to the lower surface of the turntable 14 and the two surfaces of the shoe 26 although not perpendicularly to the helical upper surface of the turntable 14. The radius of the circle for the array of apertures 50 is equal to the distance between the center of the mounting aperture 34 and the line defining the forward edge surface portions 32 of the shoe 26 so that the axis of a guide aperture 50 is aligned with the line defined by the edge surface portions 32 when the turntable 14 is rotated to place that axis in alignment with the guide line 30 of the pointer portion 28. As best seen in FIG. 3, the shoe 26 has an aperture 56 which has its axis aligned with the edge surface portions 32 and the guide line 30 so that the several guide apertures 50 will register therewith when rotated into operative position.

As best seen in FIG. 2, the side surface 41 of the turntable 14 is provided with a series of guide lines 52 in radial alignment with the series of apertures 50 and extending between the upper and lower surfaces; these guide lines 52 are visible to the user of the tool when he is disposed thereabove because of the tapering nature of the side surface 41. As best seen in FIG. 2, the bottom surface of the turntable is provided with a series of recesses 54 disposed in a circular array having a radius somewhat greater than that of the apertures 50 and with a proportionately greater arcuate spacing therebetween so as to permit engagement with the locking projection 38 on the shoe 26 to orient the axes of the several apertures 50 in alignment with the guide line 30 and the edge surface portions 32 as they are rotated into operative position.

As best seen in FIG. 5, the adjusting nut assembly 16 is comprised of a bolt 58 having its head seated in the frustoconical boss 36 of the shoe 26 and extending upwardly through the mounting aperture 44 of the turntable 14. A relatively large knurled nut 60 is threadably secured to the shank of the bolt 58 and partially seated within the counterbore 48 in the upper surface of the turntable 14. In this manner, the turntable 14 may be securely engaged in a preselected position by threadably tightening the nut 60 upon the bolt 58 so that the locking pin 38 on the shoe 26 snugly seats within the corresponding recess 54 in the bottom surface of the turntable 14, thus preventing any inadvertent relative rotation of the turntable 14 upon the shoe 26.

Turning now to the handle or housing 12, this is best illustrated in FIG. 5 of the appended drawings. It is of generally clam shell construction and comprised of two sections or halves 62,64 divided along the vertical longitudinal center line which are secured together by screws 66. The handle sections 62,64 have a pair of vertically spaced longitudinally extending ribs 68, 70 snugly seating therebetween the center portion 22 of the frame member 10. The housing sections 62, 64 also have channels 72, 74 extending downwardly at an angle to the ribs 68, 70 and which snugly seat the legs 18, 20 of the frame member 10. In this manner, the handle or housing 12 is securely engaged in fixed position upon the frame member 10.

In the front surface of the handle sections 62, 64 there is provided a recessed portion 76 with an aperture 78 in the upper end thereof. Slidably seated in the recessed portion 76 is a door 80 which may be moved up and down within the recessed portion 76 to open or close the aperture 78. As will be appreciated, the aperture 78 provides access to the interior of the housing or handle 12 above the center portion 22 of the frame member 10. Drill bits and the like may be stored therein.

In operation of the drill guide, the user selects the drill guide aperture 50 generally corresponding to the size of the drill bit which he proposes to employ in his drill. He rotates this guide aperture into alignment with the guide line 30 on the pointer portion after loosening the nut 60 of the adjusting nut assembly 16. When properly aligned, the locking projection 38 on the shoe 26 will seat in the corresponding recess 54 in the bottom surface of the turntable 14. The center line for the hole to be drilled is scribed upon the surface of the workpiece by two perpendicular lines. The drill guide is then placed upon the workpiece with the guideline 30 on the pointer portion 28 registering with one of the scribe lines and with the edge surface portions 32 registering with the other of the scribe lines.

As will be appreciated, the drill guide seats stably upon the surface or the work piece by reason of the relatively large surface area of the shoe 26 and the spaced flange 24 on the rear leg 18. Relative movement is minimized by the frictional surface provided by the pad 40 on the bottom surface of the shoe 26.

It will be appreciated that various materials may be employed for the construction of the components of the drill guide. Most conveniently, the handle or housing is molded from synthetic plastic material in the manner illustrated in order to effect maximum economy and to provide a light weight durable assembly. The frame member is most conveniently formed from a single strip of sheet metal bent and cut to provide the desired configuration and apertures. The turntable member may be fabricated from a variety of materials which will provide low frictional sliding and rotational support for the drill bits received in the guide apertures thereof including metal and synthetic plastic. Although resins such as nylon, polycarbonate and polyacetals are used for this purpose, generally it has been found more desirable to employ hardened steel for maximum dimensional stability and resistance to abrasion.

The configuration of the several components may vary from that which is illustrated in the accompanying drawings. For example, the turntable may be a parallel surfaced disk rather than the helix; however, the helical configuration affords the advantage of increasing the thickness of the turntable and thereby the length of the drill guide aperture as the radius of that aperture increases. This increases the overall length of support and guide surface for a larger diameter drill bit while at the same time minimizing the weight of the structure and the area of frictional contact for smaller diameter drill bits.

As an alternate to the pointer structure for effecting alignment of the drill guide aperture, the forward edge of the shoe may be provided with an arcuate notch serving as the recess or hole for passage of the drill bit therethrough and the guidelines 52 on the side surfaces of the turntable may be used to effect alignment with the perpendicular scribe line on the work piece. However, the illustrated embodiment is preferred because the guideline 30 in the pointer portion is positioned more closely adjacent the work and extends parallel to the surface of the work. To facilitate rotational adjustment of the turntable, it may be desired to insert spring means such as a compression spring between the frustoconical surface portion 46 in the turntable and the frustoconical boss of the shoe, whereby the spring will urge the turntable upwardly when the nut is loosened.

Thus it can be seen that the drill guide of the present invention provides a structure in which the drill guide apertures are spaced in a generally circular array about a turntable member rotatably supported upon a shoe for facile changing of the drill guide aperture. The drill guide includes means for quick and accurate alignment of the drill guide apertures in the turntable with the center proposed for the hole to be drilled in the workpiece. In the drill guide of the present invention, the handle or housing provides convenient means for the storage of drill bits and the like.

Having thus described the invention, I claim:

1. A drill guide comprising a frame member providing a generally planar shoe for seating upon the surface of a workpiece to be drilled and having an aperture extending perpendicularly therethrough for alignment with the location in the workpiece for drilling of a hole; a turntable rotatably seated upon said shoe and having a multiplicity of axially extending guide apertures disposed radially outwardly from the axis of rotation thereof; means rotatably mounting said turntable on said shoe, said means permitting rotation of said turntable for rotation of a preselected one of said guide apertures into alignment with the aperture in said shoe; aligning means on said shoe for aligning said aperture in said shoe upon a workpiece surface with an indicium representing the location of the hole to be drilled in the workpiece; and means on said turntable and said shoe for ensuring registry of the selected guide aperture in said turntable with said aperture in said shoe, said registry ensuring means being spaced from said rotatable mounting means and from said guide apertures of said turntable.

2. A drill guide comprising a frame member providing a generally planar shoe for seating upon the surface of a workpiece to be drilled and having an aperture extending perpendicularly therethrough for alignment with the location in the workpiece for drilling of a hole; a turntable rotatably seated upon said shoe and having a multiplicity of axially extending guide apertures disposed radially outwardly from the axis of rotation thereof; means rotatably mounting said turntable on said shoe, said means permitting rotation of said turntable for rotation of a preselected one of said guide apertures into alignment with the aperture in said shoe; aligning means on said shoe for aligning said aperture in said shoe upon a workpiece surface with an indicium representing the location of the hole to be drilled in the workpiece; said aligning means comprising a generally V-shaped pointer portion on said shoe intermediate the length of its forward edge, the edge surface portions to either side of said pointer portion being aligned and said pointer portion having a guide line extending perpendicularly to the line defined by said edge surface portions, the axis of said aperture in said shoe being aligned with the point of intersection between the line defined by the said guide line and the line defined by said edge surface whereby the drill guide may be positioned on perpendicular lines scribed on the surface of the workpiece with the preselected drill guide apertures in registry with the intersection of the scribed lines.

3. The drill guide in accordance with claim 2 wherein said aperture in said shoe is a hole adjacent the intersection between said pointer portion of said shoe, the axis of said aperture being in alignment with the intersection of the lines defined by said guide line of said pointer portion and the line defined by said edge surface portions to the opposite sides thereof.

4. The drill guide in accordance with claim 1 wherein said guide apertures are disposed in a circular array about the axis of rotation of said turntable, the radius of said circular array being equal to the distance from the axis of rotation of said turntable on said shoe to the center line of said aperture in said shoe.

5. The drill guide in accordance with claim 1 wherein said mounting means comprises a threaded fastener seated in an aperture in said shoe and in a cooperating aperture in said turntable, said threaded fastener having a releasable nut to permit rotation of said turntable.

6. The drill guide in accordance with claim 1 wherein said registry ensuring means includes an upstanding locking projection on said shoe and at least one cooperating recess formed in the bottom surface of said turntable to lock said turntable against relative rotation upon registery thereof.

7. The drill guide in accordance with claim 6 wherein said turntable has a multiplicity of recesses therein each cooperating with one of said drill guide apertures so as to ensure proper alignment thereof with the cooperating drill aperture in said shoe.

8. A drill guide comprising a frame member providing a generally planar shoe for seating upon the surface of a workpiece to be drilled and having an aperture extending perpendicularly therethrough for alignment with the location in the workpiece for drilling of a hole; a turntable rotatably seated upon said shoe and having a multiplicity of axially extending guide apertures disposed radially outwardly from the axis of rotation thereof; means rotatably mounting said turntable on said shoe, said means permitting rotation of said turntable for rotation of a preselected one of said guide apertures into alignment with the aperture in said shoe; aligning means on said shoe for aligning said aperture in said shoe upon a workpiece surface with an indicium representing the location of the hole to be drilled in the workpiece said turntable being of generally helical configuration providing a ramp type upper surface with the largest of the drill guide apertures being positioned adjacent the upper end of said helical surface and the smallest of said drill guide apertures being positioned adjacent the lower end of said helical surface.

9. The drill guide in accordance with claim 1 wherein said shoe has affixed to the bottom surface thereof a pad of material providing enhanced frictional properties to minimize slippage of the drill guide upon the workpiece surface.

10. A drill guide comprising a frame member providing a generally planar shoe for seating upon the surface of a workpiece to be drilled and having an aperture extending perpendicularly therethrough for alignment with the location in the workpiece for drilling of a hole; a turntable rotatably seated upon said shoe and having a multiplicity of axially extending guide apertures disposed radially outwardly from the axis of rotation thereof; means rotatably mounting said turntable on said shoe, said means permitting rotation of said turntable for rotation of a preselected one of said guide apertures into alignment with the aperture in said shoe; aligning means on said shoe for aligning said aperture in said shoe upon a workpiece surface with an indicium representing the location of the hole to be drilled in the workpiece said frame member having a generally inverted U-shaped body portion with said shoe extending forwardly from one of the legs of said body portion and lying in a common plane with the free end of the other leg of said body portion so as to provide stable seating upon the workpiece surface.

11. The drill guide in accordance with claim 10 wherein said frame member has a hollow handle disposed about the body portion thereof, said hollow handle having a moveable closure providing access to the interior thereof for storage of drill bits and the like.

12. A drill guide comprising a frame member providing a generally planar shoe for seating upon the surface of a workpiece to be drilled and having an aperture extending perpendicularly therethrough for alignment with the location in the workpiece for drilling of a hole; a turntable rotatably seated upon said shoe and having a multiplicity of axially extending guide apertures disposed radially outwardly from the axis of rotation thereof; means rotatably mounting said turntable on said shoe, said means permitting rotation of said turntable for rotation of a preselected one of said guide apertures into alignment with the aperture in said shoe; aligning means on said shoe for aligning said aperture in said shoe upon a workpiece surface with an indicium representing the location of the hole to be drilled in the workpiece said turntable having a generally circular bottom surface and a side surface tapering upwardly and inwardly to a reduced diameter circular cross section, said side surface having a multiplicity of lines extending generally vertically thereon in radial alignment with said drill guide apertures so as to facilitate alignment thereof with the aperture in said shoe.

13. The drill guide in accordance with claim 3 wherein said guide apertures are disposed in a circular array about the axis of rotation of said turntable, the radius of said circular array being equal to the distance from the axis of rotation of said turntable on said shoe to the center line of said aperture in said shoe; and wherein said turntable has a generally circular bottom surface and its side surface tapers upwardly and inwardly to a reduced diameter circular cross section, said side surface having a multiplicity of lines extending generally vertically thereon in radial alignment with said drill guide apertures so as to facilitate alignment thereof with the aperture in said shoe.

14. The drill guide in accordance with claim 3 wherein said guide apertures are disposed in a circular array about the axis of rotation of said turntable, the radius of said circular array being equal to the distance from the axis of rotation of said turntable on said shoe to the center line of said aperture in said shoe; and wherein said shoe has an upstanding locking projection thereon and said turntable has a multiplicity of recesses in the bottom surface thereof each cooperating with one of said drill guide apertures and seating said locking projection when the corresponding drill guide aperture is aligned with said pointer portion.

* * * * *